(12) United States Patent
Kubota

(10) Patent No.: US 12,423,843 B2
(45) Date of Patent: Sep. 23, 2025

(54) IMAGE PROCESSING DEVICE AND MACHINE TOOL

(71) Applicant: DMG MORI CO., LTD., Nara (JP)

(72) Inventor: Junichi Kubota, Nara (JP)

(73) Assignee: DMG MORI CO., LTD., Nara (JP)

( * ) Notice: Subject to any disclaimer, the term of this patent is extended or adjusted under 35 U.S.C. 154(b) by 485 days.

(21) Appl. No.: 18/070,898

(22) Filed: Nov. 29, 2022

(65) Prior Publication Data

US 2023/0089383 A1 Mar. 23, 2023

Related U.S. Application Data

(63) Continuation of application No. PCT/JP2021/041336, filed on Nov. 10, 2021.

(30) Foreign Application Priority Data

Nov. 11, 2020 (JP) .................................. 2020-187758

(51) Int. Cl.
*G06T 7/55* (2017.01)
*G06T 7/00* (2017.01)
*G06T 7/13* (2017.01)
*H04N 23/695* (2023.01)

(52) U.S. Cl.
CPC .............. *G06T 7/55* (2017.01); *G06T 7/0008* (2013.01); *G06T 7/13* (2017.01); *H04N 23/695* (2023.01)

(58) Field of Classification Search
CPC ........... G06T 7/55; G06T 7/0008; G06T 7/13; H04N 23/695; B23Q 17/249; B23Q 17/2457; G01B 11/002
See application file for complete search history.

(56) References Cited

U.S. PATENT DOCUMENTS

| | | | |
|---|---|---|---|
| 2013/0176429 A1 | 7/2013 | Kurahashi | |
| 2013/0208286 A1* | 8/2013 | Kurahashi | B23Q 17/22 356/601 |
| 2016/0334777 A1 | 11/2016 | Sato | |
| 2023/0096477 A1* | 3/2023 | Kanto | G05B 19/404 700/186 |
| 2023/0405751 A1* | 12/2023 | Kubota | B23Q 15/12 |

FOREIGN PATENT DOCUMENTS

| | | |
|---|---|---|
| EP | 2631032 A1 | 8/2013 |
| EP | 2634526 A1 | 9/2013 |
| JP | H09101125 A | 4/1997 |
| JP | H11118444 A | 4/1999 |
| JP | 2012-091288 A | 5/2012 |
| JP | 2016-218550 A | 12/2016 |

\* cited by examiner

*Primary Examiner* — Charles T Shedrick
(74) *Attorney, Agent, or Firm* — IP Business Solutions, LLC

(57) ABSTRACT

An image processing device includes: an imaging execution unit that captures a first partial image including a part of a tool by a camera, a position specifying unit that specifies a next imaging position on the basis of a partial shape of the tool included in the first partial image, and a position control unit that changes the relative positions of the tool and the camera to the specified imaging position. The imaging execution unit captures a second partial image including a part of the tool at the next imaging position.

9 Claims, 19 Drawing Sheets

IMAGE PROCESSING DEVICE AND MACHINE TOOL

CROSS REFERENCE TO RELATED APPLICATIONS

This application is a continuation application of International Application No. PCT/JP2021/041336, filed on Nov. 10, 2021, which claims priority to and the benefit of Japanese Patent Application No. 2020-187758, filed on Nov. 11, 2020. The contents of these applications are incorporated herein by reference in their entirety.

BACKGROUND OF INVENTION

1. Field

The present invention relates to a technology for managing tool shapes in machine tools.

2. Description of Related Art

Examples of machine tools include devices for cutting a workpiece into a desired shape, and devices for depositing metal powder or the like to make a workpiece. Examples of machine tools for cutting include a turning center that machines a workpiece by applying a cutting tool to the workpiece that is being turned, a machining center that machines a workpiece by applying a turning tool to the workpiece, and a combined machine including these functions in combination.

The tool is fixed to a tool holding unit such as a spindle or a tool rest. The machine tool processes a workpiece while moving the tool rest and the like and selecting the tool to machine the workpiece according to a processing program prepared in advance.

When a tool rest or the like is moved three-dimensionally in a narrow machining chamber, it must be controlled so that the tool does not come into contact with the workpiece itself, tailstock supporting the workpiece, steady rest, and other equipment. Because tools vary in shape and size, contact with one tool might occur at a position where contact does not occur with another tool. For this reason, when registering a tool in a machine tool, the tool ID must be associated with the tool shape (e.g., see PTL 1).

RELATED ART LIST

PTL 1: JP 2016-218550 A

In general, tool shape data is downloaded from a website of the tool manufacturer and input to a machine tool to register tool IDs and tool shapes in association with each other. However, such a registration method is burdensome in terms of the workload and the burden of checking to prevent input errors.

SUMMARY

An image processing device according to one aspect of the present invention includes: an imaging execution unit that captures a first partial image including a part of the tool by a camera; a position specifying unit that specifies a next imaging position on the basis of a partial shape of the tool included in the first partial image; and a position control unit that changes the relative positions of the tool and the camera to the specified imaging position.

The imaging execution unit captures a second partial image including a part of the tool at the next imaging position.

An image processing device according to another aspect of the present invention includes: receiving unit that receives (1) a first partial image including a part of a tool captured by a camera, and (2) a second partial image including a part of the tool captured by specifying the next imaging position and changing the relative positions of the tool and the camera to the specified imaging position on the basis of a partial shape of the tool included in the first partial image; and an image processing unit that extracts first contour data of a part of the tool from the first partial image and second contour data of a part of the tool from the second partial image, to generate tool shape data of the tool on the basis of the first and second contour data.

A machine tool according to a certain aspect of the present invention includes: a camera; a tool holding unit to which a tool is attachable; a machining control unit that machines a workpiece with a tool according to a machining program; an imaging execution unit that captures a first partial image including a part of the tool by the camera; a position specifying unit that specifies a next imaging position on the basis of a partial shape of the tool included in the first partial image; and a position control unit that changes the relative positions of the tool and the camera to the next imaging position.

The imaging execution unit captures a second partial image including a part of the tool at the next imaging position.

The present invention facilitates efficient image recognition of a tool shape.

DETAILED DESCRIPTION

Figure 1:
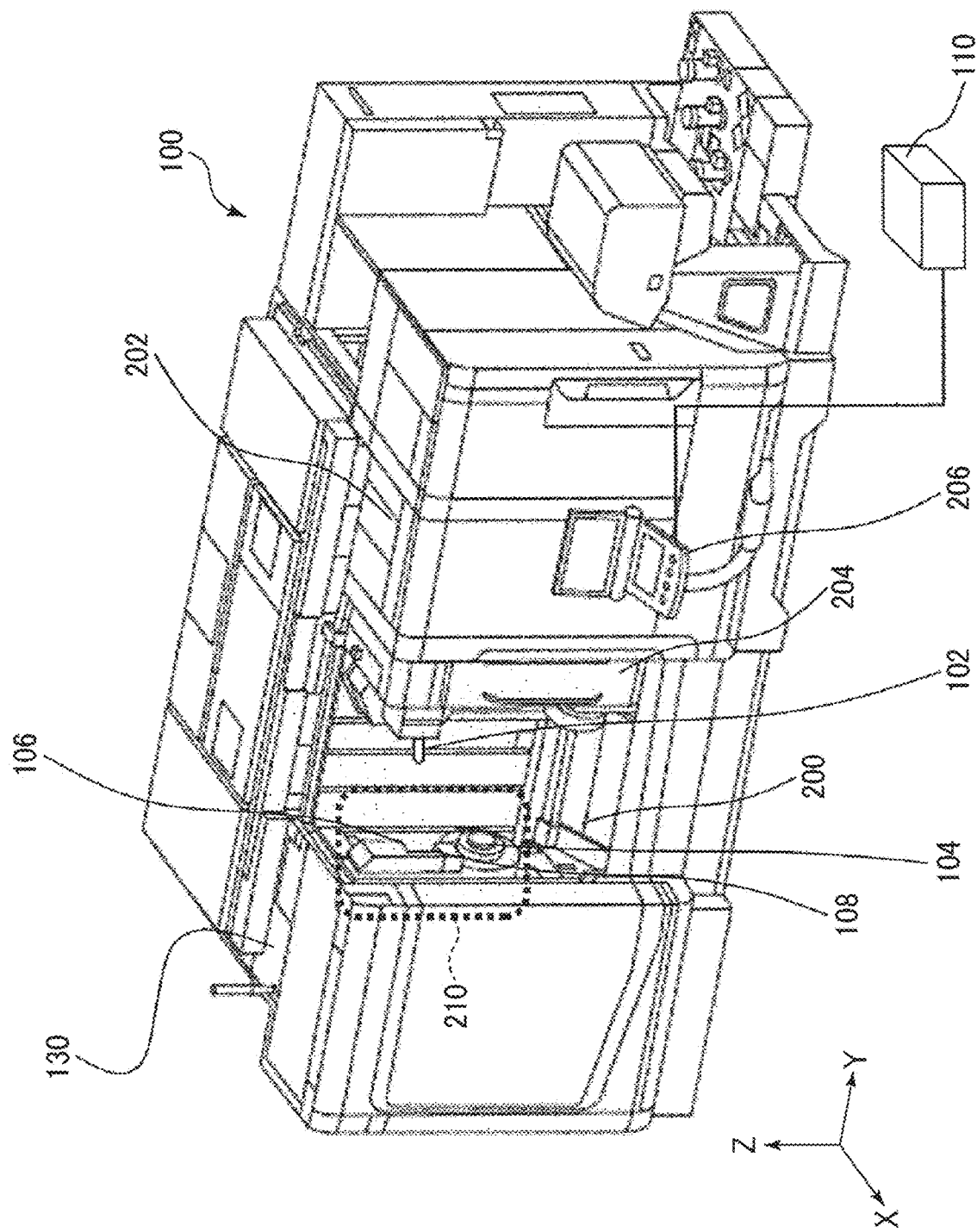
FIG. 1 is an external view of a machine tool.

FIG. 1 is an external view of a machine tool 100.

The machine tool 100 in this embodiment is a multitasking machine for machining a workpiece placed in a machining area 200. The workpiece is fixed to a holding unit 104 and cut by a tool 102 attached to a spindle, which is another holding unit. The holding unit 104 holding the workpiece is rotationally driven by a driving mechanism.

When the tool 102 is inserted into a tool recognition area 210, a lighting device 108 provided at a lower position illuminates the tool 102 and a camera 106 provided at an upper position captures an image of the tool 102. On the basis of the result of this image capturing, tool shape recognition, described later, is performed. The configuration of the tool recognition area 210 will be further described with reference to FIG. 2 below.

The machine tool 100 is provided with a cover 202 that shuts off the outside. The cover 202 includes a door 204. A user opens the door 204 to install a workpiece in the machining area 200 and to remove the workpiece from the machining area 200. An operation panel 206 accepts various operations on the machine tool 100 from the user.

The operation panel 206 is connected to an image processing device 110. In this embodiment, the main part of the machine tool 100 and the image processing device 110 are connected via a wiring cable. The image processing device 110 may be incorporated into the machine tool 100, e.g., as an internal device of the operation panel 206.

A tool storage unit 130 stores a plurality of tools 102. A tool 102 is selected from a plurality of tools 102 stored in the tool storage unit 130 by a tool changer (described later) and attached to the spindle. As shown in FIG. 1, the X- and Y-axes are defined in the horizontal direction and the Z-axis is defined in the vertical direction. The Y-axis direction corresponds to the axial direction of the spindle and workpiece.

Figure 2:
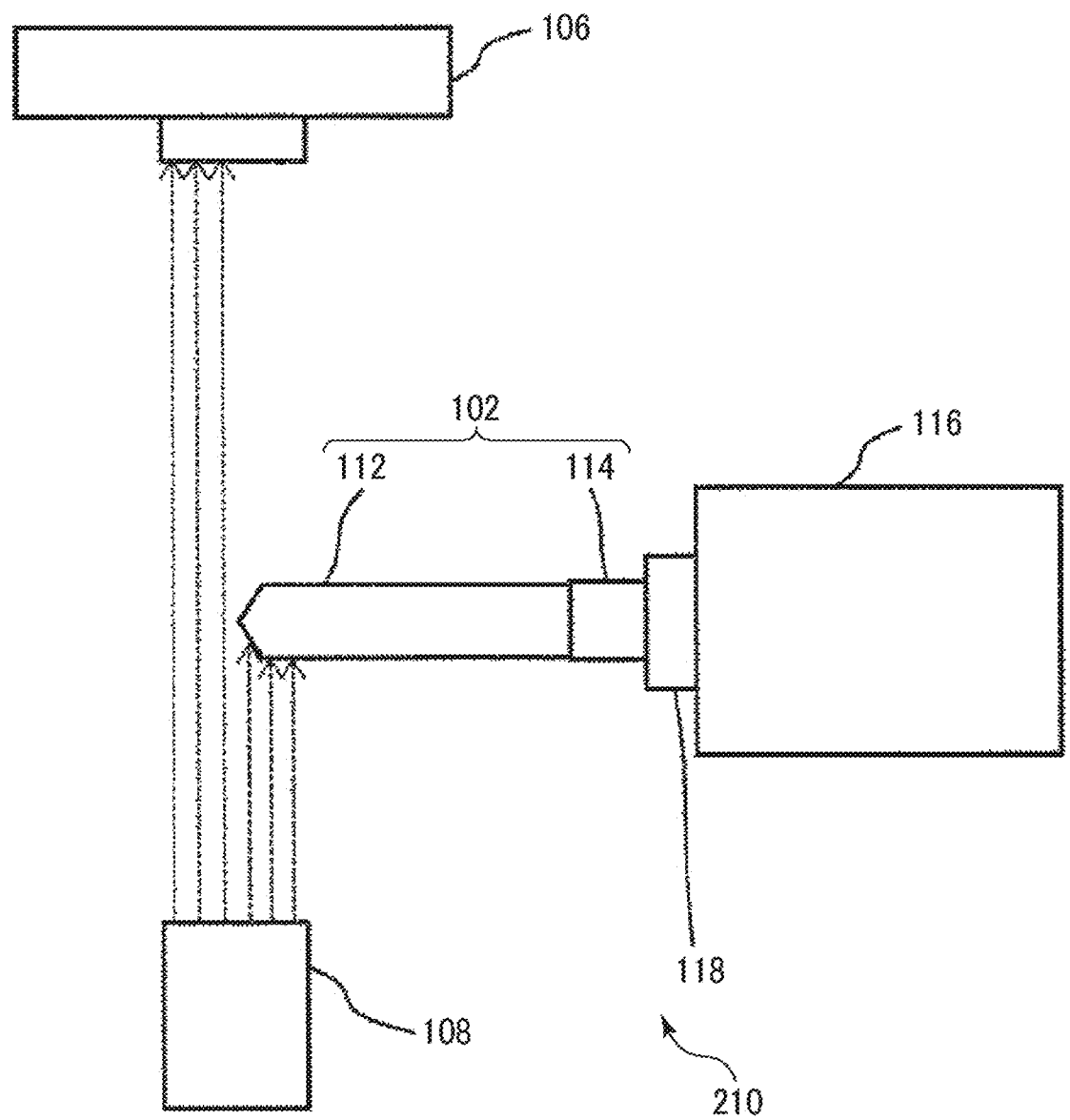
FIG. 2 is a schematic diagram illustrating a positional relation among a tool, a camera, and lighting device in a tool recognition area.

FIG. 2 is a schematic diagram illustrating a positional relation among the tool 102, the camera 106, and the lighting device 108 in the tool recognition area 210.

The tool 102 includes a blade part 112 used for machining the workpiece and a shank part 114 which is a part to be fixed to a holder 118 of a spindle 116. The spindle 116 is configured to be rotatable and movable while holding the tool 102. The spindle 116, which is also a holding unit, can also rotate the holding tool.

The camera 106 is equipped with an image sensor (image pickup element) such as complementary metal oxide semiconductor (CMOS) or charge-coupled device (CCD). The camera 106 images the tool 102 attached to the spindle 116 from above (in the Z-axis direction). The camera 106 is fixed in the tool recognition area 210. The tool 102 can be imaged from multiple directions by rotating the tool 102 about the Y-axis with the spindle 116. In addition, multiple locations of the tool 102 can be imaged by moving the tool 102 in the horizontal direction (XY direction) with the spindle 116.

The lighting device 108 is fixed at a lower position to face the camera 106. The lighting device 108 illuminates the tool 102 from below. Transmitted illumination by the lighting device 108 enables the camera 106 to obtain high-contrast captured images that make it easy to grasp the contour position of the tool 102.

When the user newly registers a tool 102, the user sets the tool registration mode in the operation panel 206 and attaches the tool 102 to the spindle 116. Next, the user inputs a desired tool ID. The spindle 116 moves and rotates the tool 102, and the fixed camera 106 automatically images the tool 102 from various positions and directions. From a number of captured images obtained by the camera 106, the tool shape is recognized and the tool ID and the tool shape are registered in association with each other. With such a control method, the tool shape can be automatically registered. Details of how to recognize tool shapes will be described later.

The camera 106 in this embodiment has a resolution of about one million pixels (1224×1024). The imaging range is about 300 millimeters×300 millimeters. The camera 106 can capture up to 80 images per second.

Figure 3:
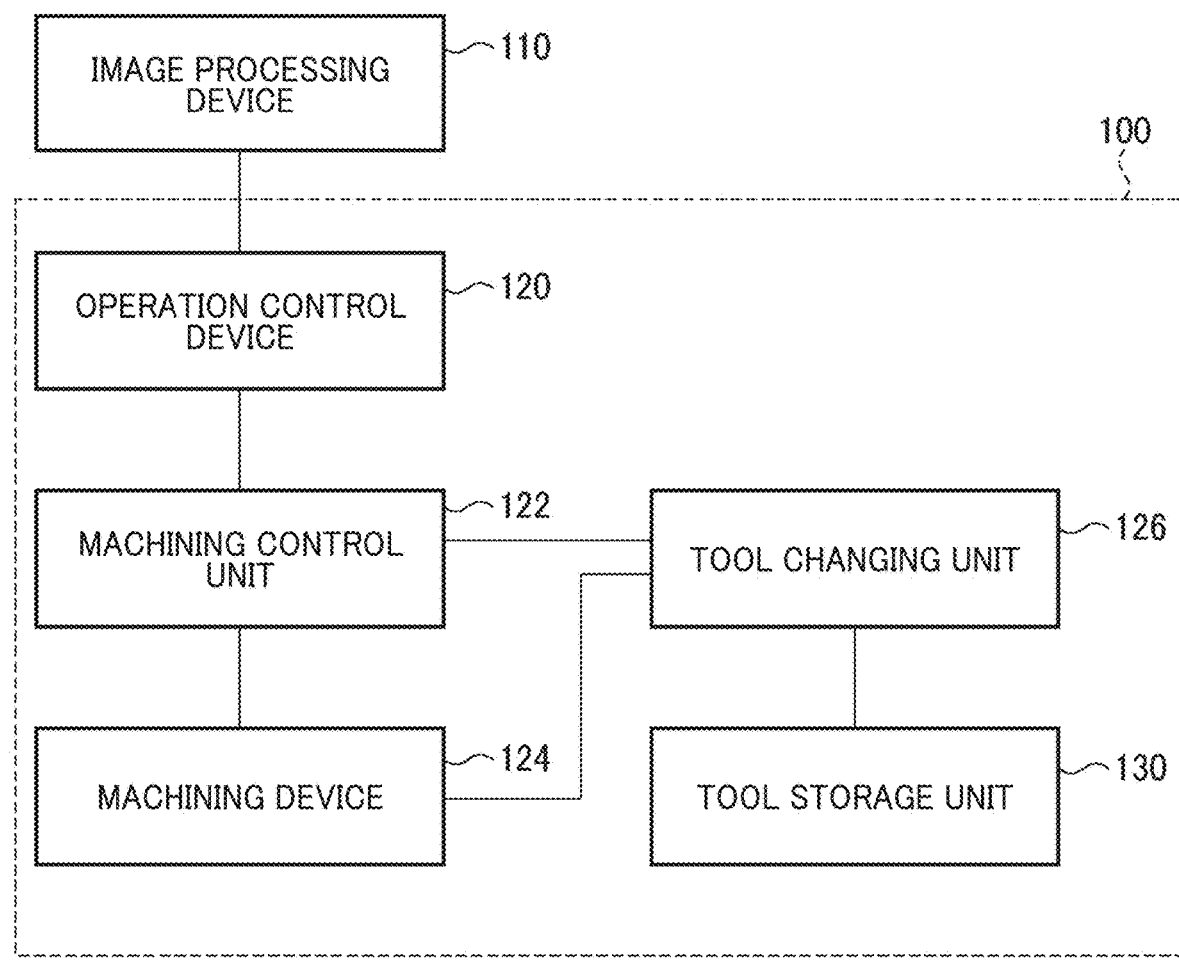
FIG. 3 illustrates a hardware configuration of a machine tool and an image processing device.

FIG. 3 illustrates a hardware configuration of the machine tool 100 and the image processing device 110.

The machine tool 100 includes an operation control device 120, a machining control unit 122, a machining device 124, a tool changing unit 126, and the tool storage unit 130. The machining control unit 122, which functions as a numerical controller, transmits a control signal to the machining device 124 according to a machining program. The machining device 124 machines the workpiece by moving the spindle 116 according to instructions from the machining control unit 122.

The operation control device 120 includes the operation panel 206 and controls the machining control unit 122. The tool storage unit 130 stores tools. The tool changing unit 126 corresponds to the so-called automatic tool changer (ATC). The tool changing unit 126 takes out a tool from the tool storage unit 130 according to the change instruction from the machining control unit 122, and exchanges the tool in the spindle 116 with the tool taken out.

The image processing device 110 mainly performs image processing such as tool shape recognition. As described above, the image processing device 110 may be configured as a part of the operation control device 120.

Figure 4:
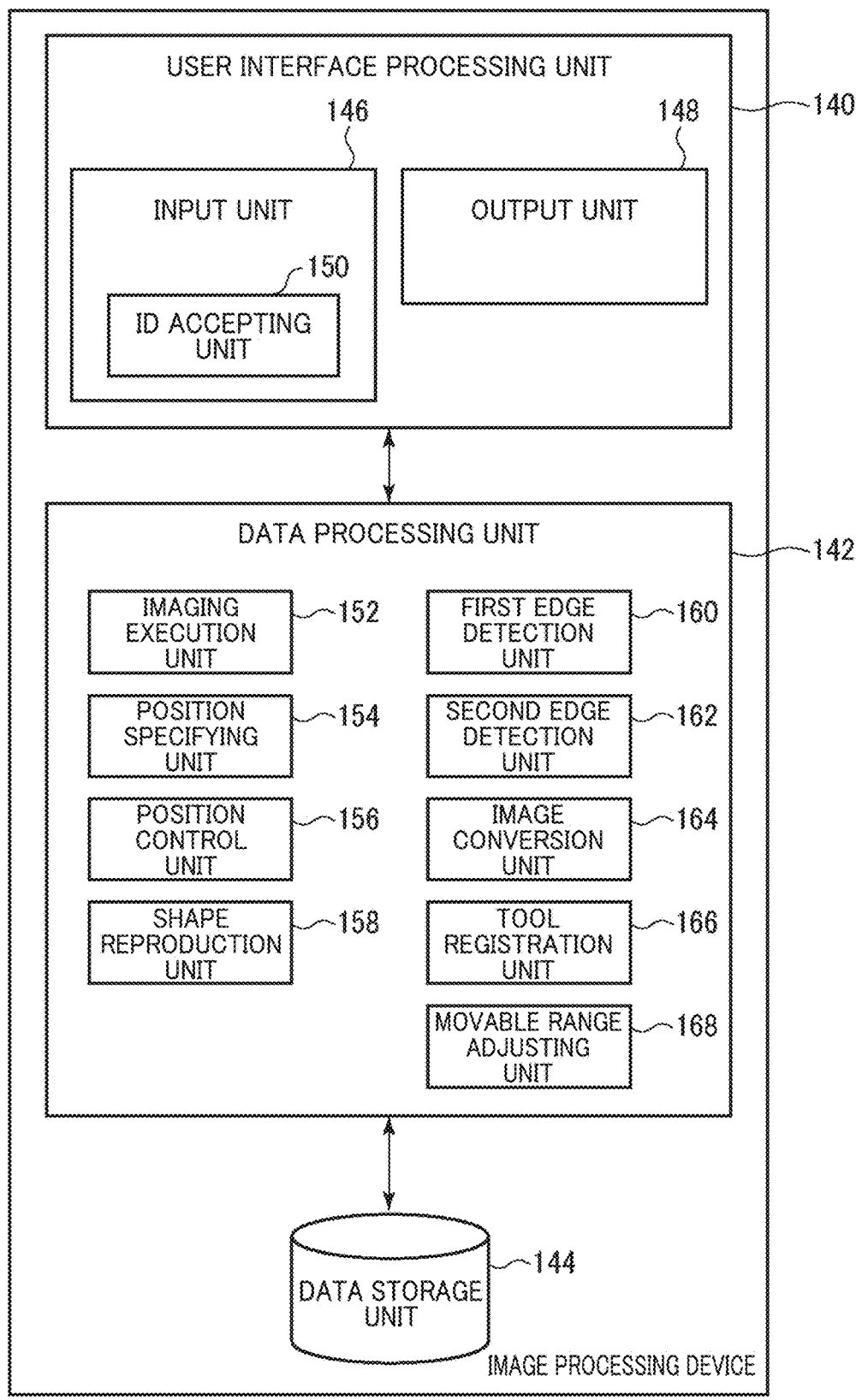
FIG. 4 is a functional block diagram of an image processing device.

FIG. 4 is a functional block diagram of the image processing device 110.

Each component of the image processing device 110 is implemented by hardware including computing units such as central processing units (CPUs) and various computer processors, a storage device such as memories and storages, and wired or wireless communication lines that connects these units and devices, and software that is stored in the storage devices and supplies processing instructions to the computing units. Computer programs may be constituted by device drivers, operating systems, various application programs on upper layers thereof, and a library that provides common functions to these programs. Each of the blocks described below represents a functional block, not a hardware block.

It should be noted that the operation control device 120 and the machining control unit 122 may also be implemented in a form in which hardware including a computing unit such as a processor, storage units such as memory and storage, and wired or wireless communication lines connecting them, and software or programs stored in the storage units to supply processing instructions to the computing units on an operating system independent from the image processing device 110.

The image processing device 110 includes a user interface processing unit 140, a data processing unit 142, and a data storage unit 144.

The user interface processing unit 140 is responsible for processing related to the user interface, such as image display and audio output, in addition to accepting operations from the user. The data processing unit 142 performs various processes on the basis of the data acquired by the user interface processing unit 140 and the data stored in the data storage unit 144. The data processing unit 142 also functions as an interface for the user interface processing unit 140 and the data storage unit 144. The data storage unit 144 stores various programs and setting data.

The user interface processing unit 140 includes an input unit 146 and an output unit 148.

The input unit 146 accepts input from a user via a touch panel or a hardware device such as a handle. The output unit 148 provides various kinds of information to the user via image display or audio output. The input unit 146 includes an ID accepting unit 150 that accepts input of a tool ID.

The data processing unit 142 includes an imaging execution unit 152, a position specifying unit 154, a position control unit 156, a shape reproduction unit 158, a first edge detection unit 160, a second edge detection unit 162, an image conversion unit 164, a tool registration unit 166, and a movable range adjusting unit 168.

The imaging execution unit 152 instructs the camera 106 to capture an image. The position specifying unit 154 calculates the moving direction of the spindle 116 by a method described later when imaging the tool 102. The position control unit 156 moves the spindle 116 when the tool 102 is imaged. The shape reproduction unit 158 generates "tool shape data" that indicates the three-dimensional shape of the tool 102 on the basis of the captured image. The first edge detection unit 160 detects "first edge-points" indicating a contour position of the tool 102. The second edge detection unit 162 also detects "second edge-points" indicating a contour position of the tool 102. The image conversion unit 164 changes the resolution of the captured image.

The tool registration unit 166 registers the tool ID and tool shape data in the data storage unit 144 in association with each other. The tool ID and tool shape data may be provided from the image processing device 110 to the operation control device 120. The movable range adjusting unit 168 is a so-called interference check module and specifies the movable range of the spindle 116 (the range within which the spindle 116 can move) on the basis of the type of machine tool 100, the shape of the workpiece, and the tool shape data of the tool 102 in use. The position at which the spindle 116 interferes with another object, such as a workpiece, varies depending on the shape and size of the tool 102. The movable range adjusting unit 168 specifies the movable range of the spindle 116 according to the tool in use, on the basis of the tool shape data. The machine tool 100 moves the spindle 116 within the movable range of the spindle 116.

Figure 5:
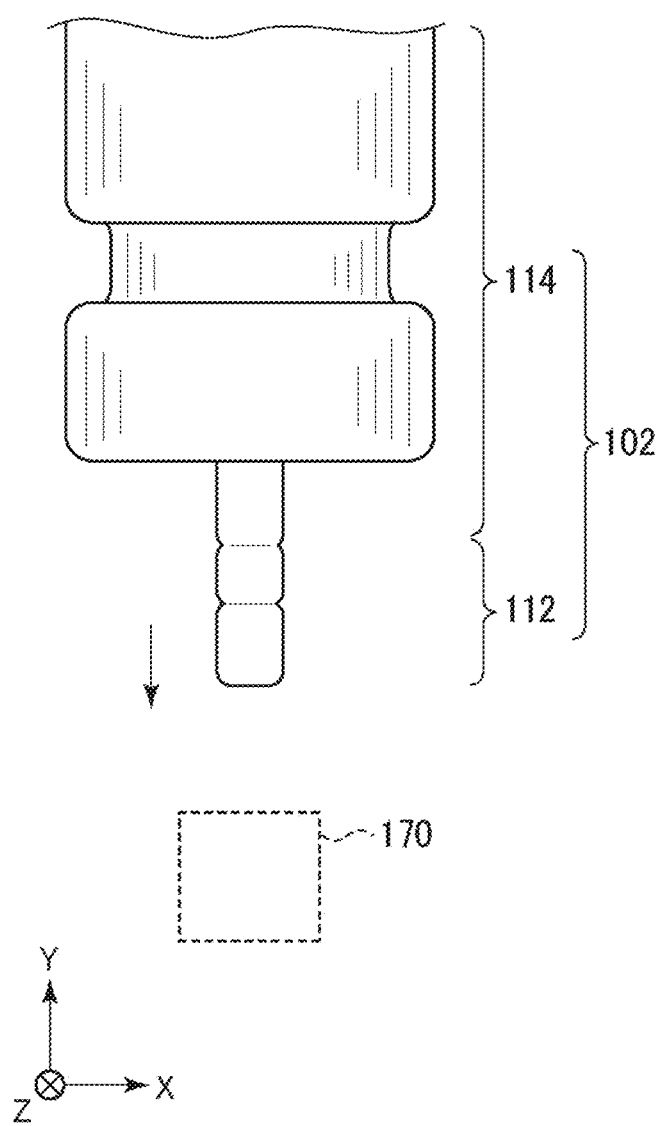
FIG. 5 is a schematic diagram illustrating a positional relation between a tool and an imaging area.

FIG. 5 is a schematic diagram illustrating a positional relation between the tool 102 and an imaging area 170.

The imaging area 170 is located just below the light-receiving surface of the camera 106. The camera 106 images an object within the imaging area 170. The position control unit 156 inserts the tool 102 into the imaging area 170 by moving the spindle 116. Since the imaging area 170 is smaller than the tool 102, it is not possible to image the entire tool 102 at one time.

Enlarging the lens of the camera 106 to enlarge the imaging area 170 will increase the cost of the camera 106. In addition, installing a large camera 106 occupying large space in the tool recognition area 210 is undesirable since this will reduce the space of the machining area 200. Therefore, in the present embodiment, a scheme is adopted in which the tool 102 is imaged by a relatively small camera 106 in multiple times, and the shape of the entire tool 102 is recognized on the basis of the plurality of the images captured in multiple times.

Tool shape recognition processing (hereafter referred to as "shape recognition processing") will take longer time as the increase in the number of times of movement of the tool 102 and the number of images captured by imaging. In order to make the shape recognition processing efficient, it is necessary to move the tool 102 efficiently so as not to capture an image that is unnecessary for recognizing the tool shape, specifically, an image that does not show the outer shape of the tool 102.

Hereafter, the captured image of a part of the tool 102 imaged by the camera 106 will be referred to as a "partial image".

Figure 6:
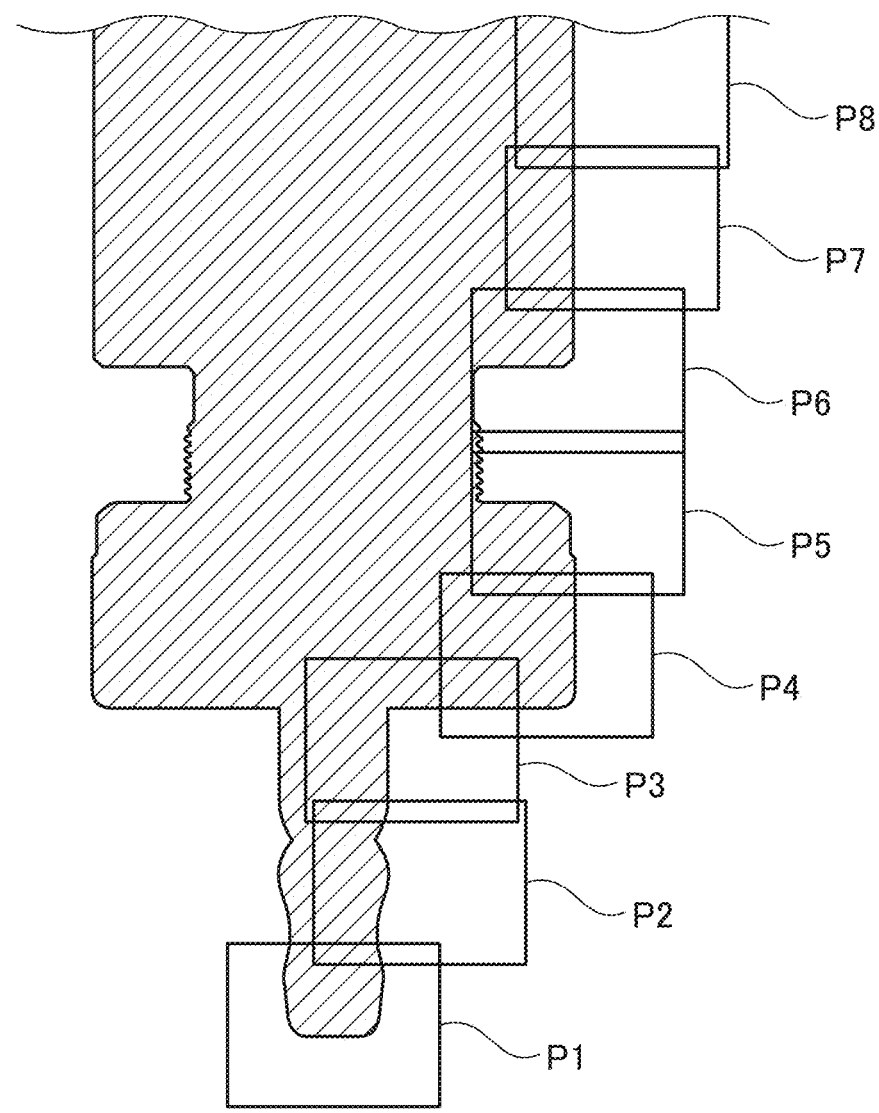
FIG. 6 is a schematic diagram illustrating a relation between a tool and a partial image.

FIG. 6 is a schematic diagram illustrating a relation between the tool 102 and a partial image.

At the time of tool registration, the position control unit 156 moves the tool 102 (the spindle 116) in the negative Y-axis direction, that is, in the direction where the imaging area 170 goes away from the tip side of the tool 102, at a constant speed. The imaging execution unit 152 constantly monitors the imaging area 170. The live view image in the imaging area 170 is transmitted from the camera 106 to the image processing device 110. When the tip of the blade part 112 is detected in the imaging area 170 (live view image), the imaging execution unit 152 instructs the camera 106 to capture an image (partial image). When instructed, the camera 106 captures the first partial image and fixes it to the memory. In FIG. 6, a partial image P1 is captured first.

Then, the position control unit 156 further moves the tool 102 (the spindle 116) in the negative Y-axis direction. At this time, the position control unit 156 slightly moves the spindle 116 in the negative X-axis direction as well so that the contour of the tool 102 does not deviate from the imaging area 170 (details will be described later). After the movement, the imaging execution unit 152 instructs the camera 106 to capture a partial image, and the camera 106 stores the second partial image P2 in the memory. In this way, the position control unit 156 moves the spindle 116 appropriately to the left and right (X-axis direction) while gradually moving the spindle 116 in the negative Y-axis direction.

The imaging execution unit 152 instructs the camera 106 to perform imaging (capturing of a partial image) in accordance with the movement of the spindle 116 so that the partial images P1 to P8 are captured. On the basis of the plurality of partial images P1 to P8, the shape reproduction unit 158 generates the contour of the tool 102, i.e., the tool shape data of the tool 102. By appropriately moving the spindle 116, the contour of the tool 102 can be appropriately image-recognized while reducing the number of times of partial image capturing.

Figure 7:
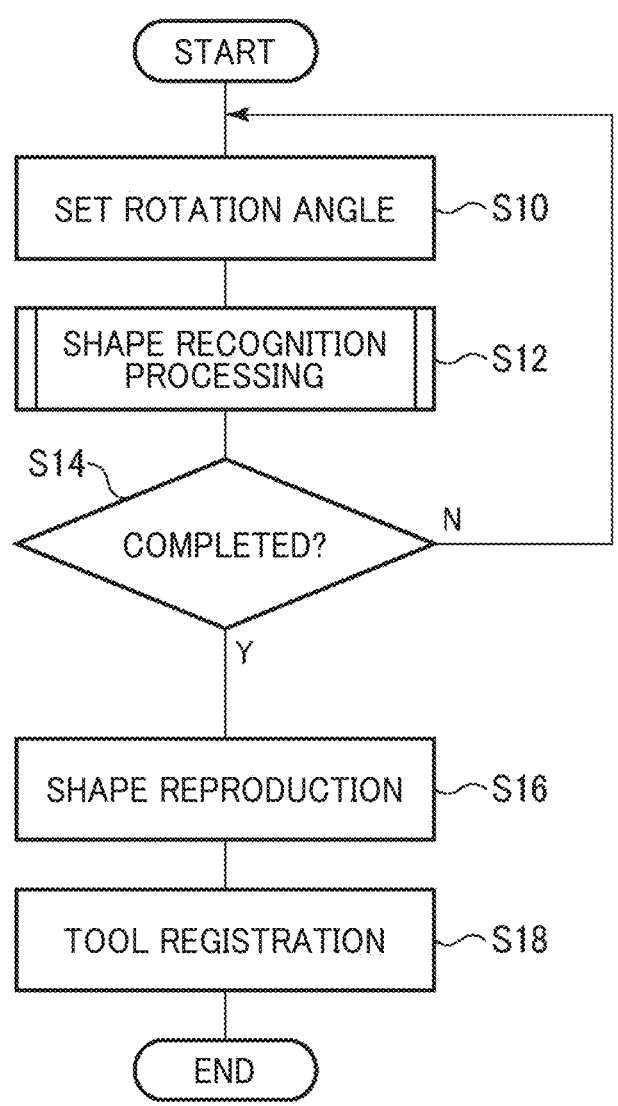
FIG. 7 is a flowchart illustrating tool registration processing.

FIG. 7 is a flowchart illustrating tool registration processing.

Tool registration is performed after a user inputs a tool ID. When the tool 102 to be registered is attached to the spindle 116 and the user inputs the tool ID, the position control unit 156 sets the rotation angle (e.g., 0 degrees) of the spindle 116 (S10). Hereafter, the rotation angle of the spindle 116 is referred to as "spindle rotation angle". In this embodiment, by rotating the tool 102 by every 12 degrees, shape recognition processing is performed for a total of 30 (=360/12) angles.

After setting the spindle rotation angle, the position control unit 156 moves the spindle 116 in the XY direction, and the imaging execution unit 152 performs shape recognition processing by capturing a plurality of partial images (S12). Details of the shape recognition processing will be described later with reference to FIG. 8 below. In the shape recognition processing, the contour of the tool 102 is specified as point sequence data at the set spindle rotation angle. If there remains an unset spindle rotation angle (S14: N), the process returns to S10 to set the next rotation angle (e.g., 12 degree). When shape recognition processing is performed for all 30 spindle rotation angles (S14: Y), the shape reproduction unit 158 generates tool shape data indicating the three-dimensional shape of the tool 102 from the point sequence data obtained for the multiple spindle rotation angles (S16). The tool registration unit 166 registers the tool ID and the tool shape data in the data storage unit 144 in association with each other (S18).

Figure 8:
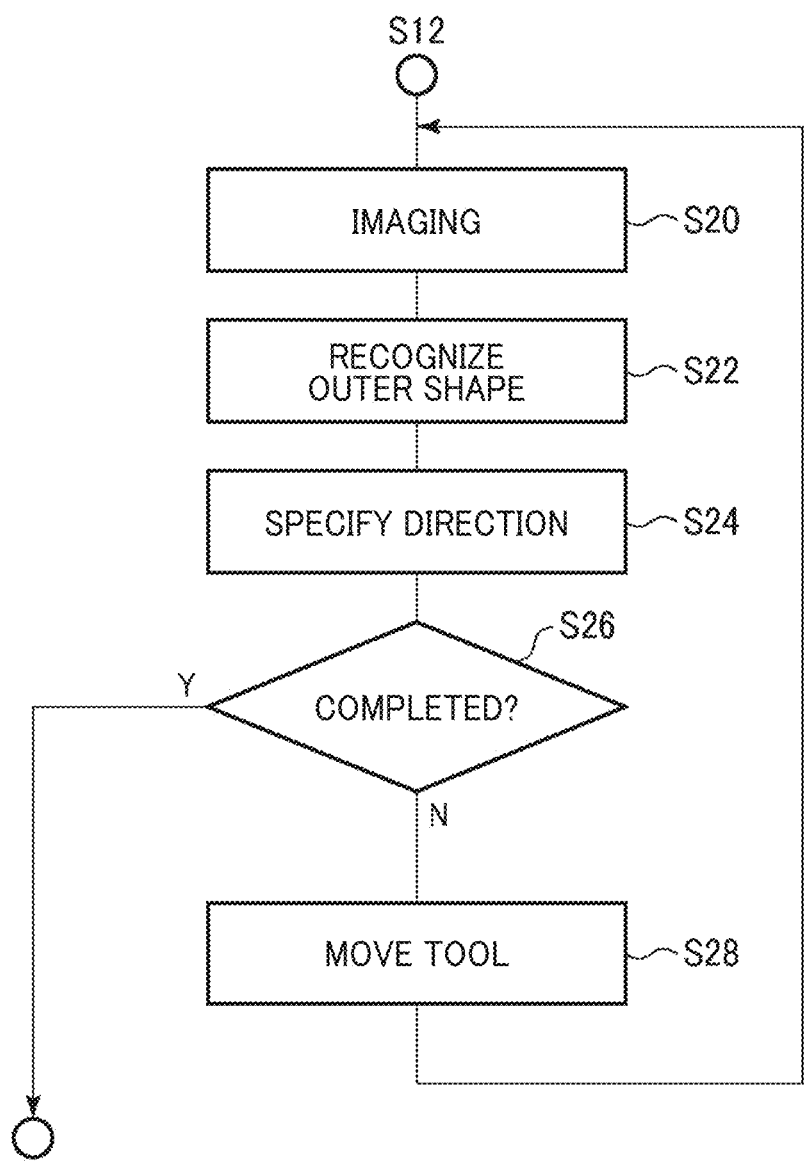
FIG. 8 is a flowchart illustrating shape recognition processing in S12 of FIG. 7.

FIG. 8 is a flowchart illustrating the shape recognition processing in S12 of FIG. 7.

After setting the spindle rotation angle, the position control unit 156 moves the spindle 116 in the negative Y-axis direction, and the imaging execution unit 152 captures a partial image (S20). The first edge detection unit 160 recognizes the outer shape position of the tool 102 in the partial image by detecting the first edge-points indicating the contour of the tool 102 from the partial image (described later in relation to FIG. 9) (S22). Next, the position specifying unit 154 specifies the next imaging position, in other words, the moving direction of the spindle 116, on the basis of the partial image of the tool 102 (S24). The method of specifying the direction of movement will be described later with reference to FIG. 11.

When it is necessary to capture the next partial image (S26: N), the position control unit 156 moves the tool 102 (the spindle 116) in the moving direction specified in S24 (S28). Image capturing is completed when the spindle 116 is moved in the negative Y-axis direction by a predetermined distance (S26: Y), and processing proceeds to S14 in FIG. 7.

As described above, the shape recognition processing includes the processing of S22 to image-recognize the contour of the tool 102 (hereafter referred to as "outer shape recognition processing") and the processing of S24 to determine the next moving direction of the tool 102 (hereafter referred to as "direction specifying processing"). Next, outer shape recognition processing and direction specifying processing will be described.

Figure 9:
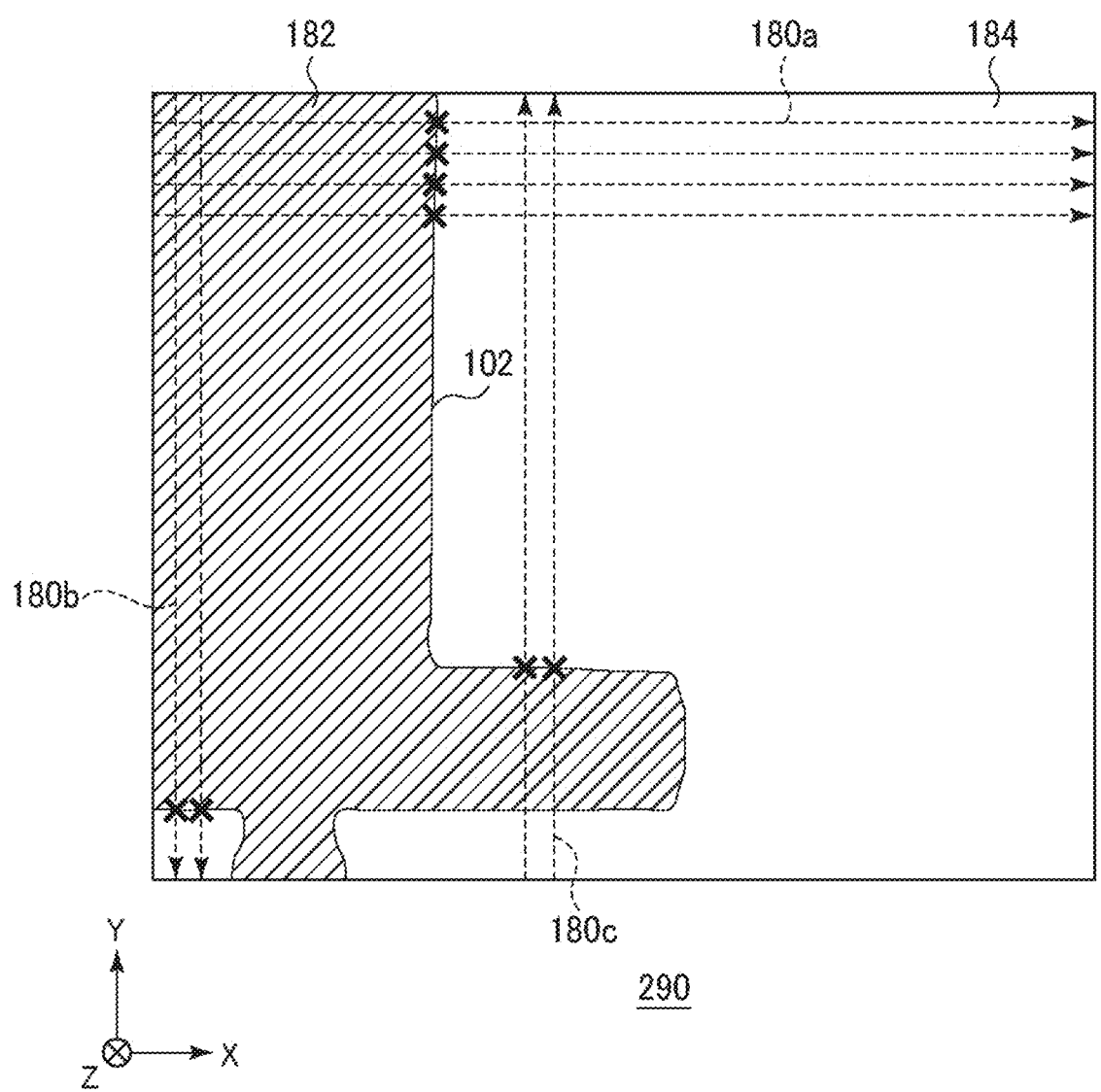
FIG. 9 illustrates a partial image when outer shape recognition processing is performed.
Figure 10:
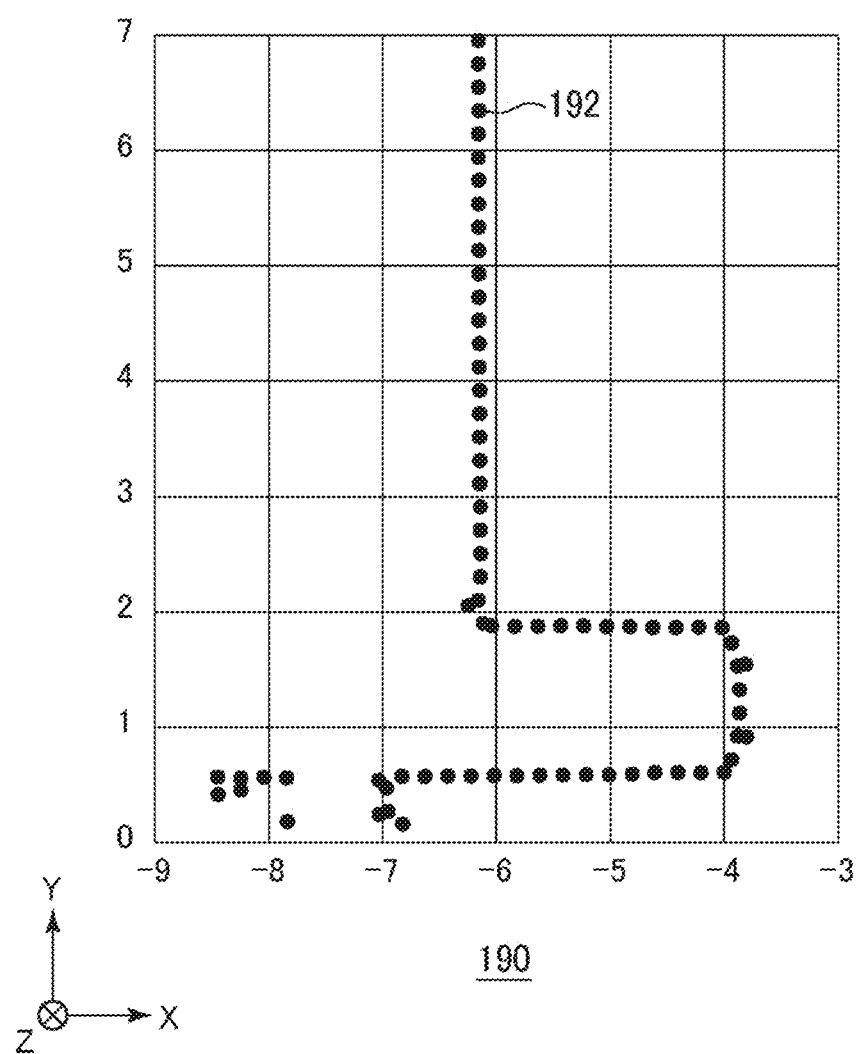
FIG. 10 illustrates a first edge-point image.

FIG. 9 illustrates a partial image 290 when external shape recognition processing is performed. FIG. 10 illustrates a first edge-point image 190.

The partial image 290 shows a silhouette of the tool 102 projected from below by the lighting device 108. The first edge detection unit 160 sets scanning lines 180a in the positive X-axis direction, and detects points located at the boundary between a dark area 182 (silhouette region where the tool 102 exists) and a light area 184 (region where the tool 102 does not exist) as the first edge-points 192. The first edge detection unit 160 detects a plurality of first edge-points 192 while shifting the scanning lines 180a at a constant pitch.

Similarly, the first edge detection unit 160 sets scanning lines 180b in the negative Y-axis direction and detects the first edge-points 192 located at the boundary between the dark area 182 and the light area 184. The first edge detection unit 160 detects a plurality of first edge-points 192 while shifting the scanning lines 180b at a constant pitch.

Furthermore, the first edge detection unit 160 sets scanning lines 180c in the positive Y-axis direction and detects the first edge-points 192 located at the boundary between the dark area 182 and the light area 184. The first edge detection unit 160 detects a plurality of first edge-points 192 while shifting the scanning lines 180c at a constant pitch.

In this way, by setting the scanning lines 180a, 180b, and 180c in the three directions, a plurality of first edge-points 192 are detected, and the first edge-point image 190 shown in FIG. 10 is acquired. The plurality of first edge-points 192 included in the first edge-point image 190 provide point sequence data indicating the outer shape of the tool 102. In this embodiment, the processing time required for the outer shape recognition processing per partial image is about 200 to 250 milliseconds.

Figure 11:
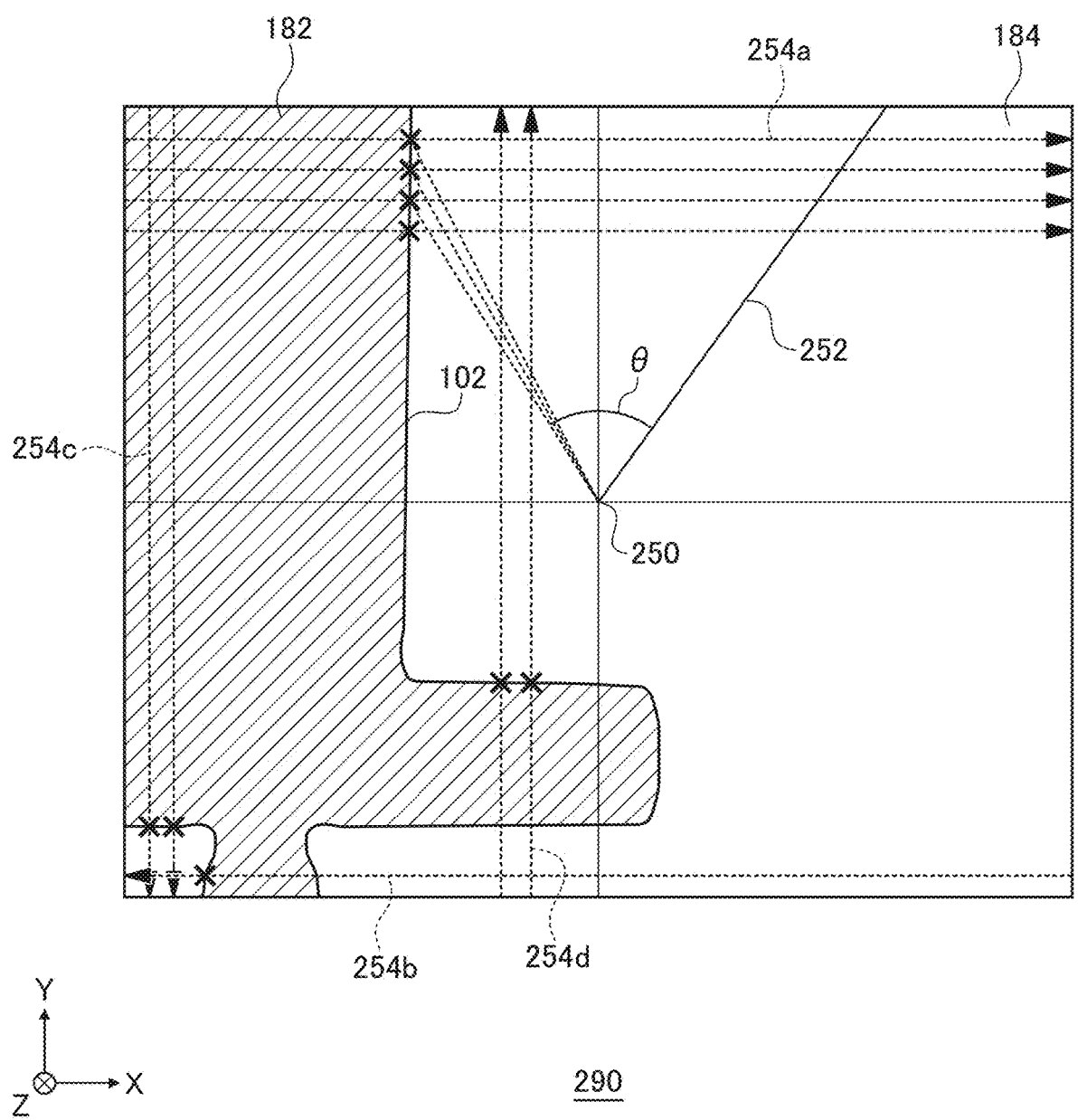
FIG. 11 illustrates a partial image when performing direction specifying processing.
Figure 12:
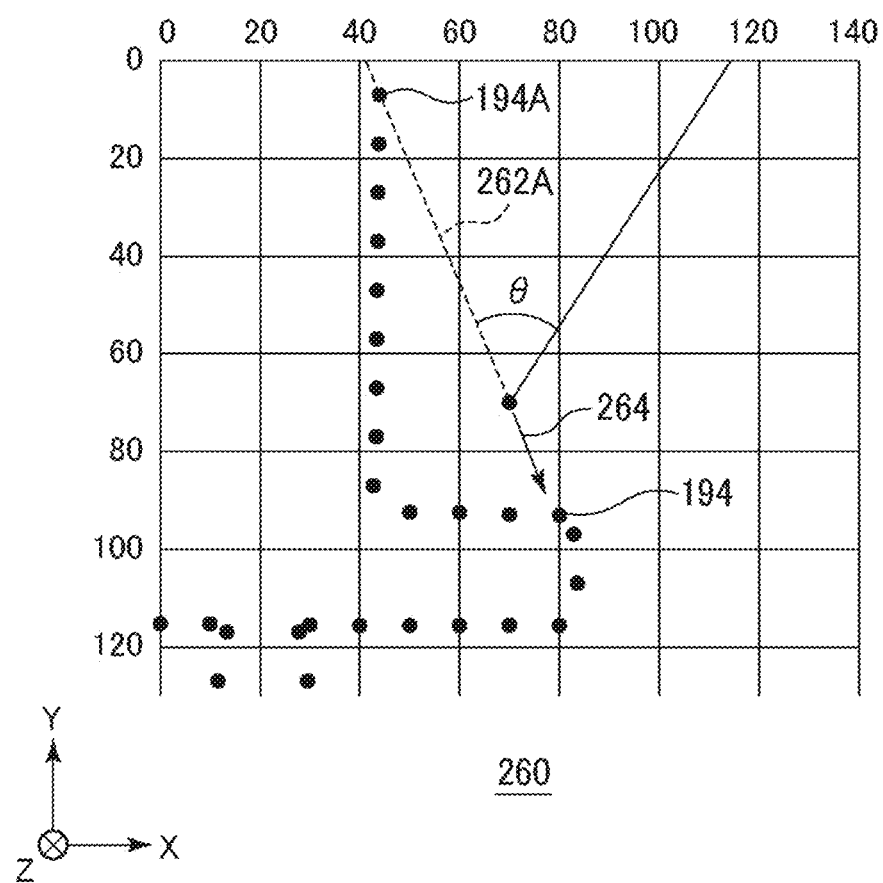
FIG. 12 is a diagram illustrating the second edge-point image.

FIG. 11 illustrates a partial image 290 when performing the direction specifying processing. FIG. 12 illustrates a second edge-point image 260.

The image conversion unit 164 sets the resolution of the partial image 290 to a low resolution of ⅛ in the direction specifying processing. The resolution is reduced in order to suppress the number of pixels to be processed to reduce the load and speed up the direction specifying processing. It is desirable for the shape recognition process to use a high-resolution partial image 290 to recognize the shape of the tool 102; on the other hand, it is more appropriate for the direction specifying processing to use a low-resolution partial image 290 because this processing is conducted only for specifying the next imaging position.

A reference point 250 is set at a predetermined position in the partial image 290. In this embodiment, the reference point 250 is set at the center of the partial image. An arbitrary reference line 252 passing through the reference point 250 is also set. The reference line 252 in this embodiment is set in the first quadrant in the XY plane when the reference point 250 is taken as the origin.

The second edge detection unit 162 sets scanning lines 254a in the positive X-axis direction, and detects points located at the boundary between the dark area 182 and the light area 184 as second edge-points 194. The second edge detection unit 162 detects a plurality of second edge-points 194 while shifting the scanning lines 254a at a constant pitch. Similarly, the second edge detection unit 162 sets scanning lines 254b in the negative X-axis direction and detects points located at the boundary between the dark area 182 and the light area 184 as the second edge-points 194. The second edge detection unit 162 detects a plurality of second edge-points 194 while shifting the scanning lines 254b at a constant pitch.

The second edge detection unit 162 sets scanning lines 254c in the negative Y-axis direction and detects a plurality of second edge-points 194 in the same manner while shifting the scanning lines 254c at a constant pitch. The second edge detection unit 162 sets scanning lines 254d in the positive Y-axis direction and detects a plurality of second edge-points 194 while shifting the scanning lines 254d at a constant pitch.

In this way, by setting the scanning lines 254a, 254b, 254c, and 254d in the four directions, a plurality of second edge-points 194 are detected, and the second edge-point image 260 shown in FIG. 12 is acquired. The second edge-points 194 are fewer than the first edge-points 192 since the resolution of the partial image is reduced.

Next, the position specifying unit 154 sets a verification line 262 connecting the reference point 250 and a second edge-point 194. The position specifying unit 154 calculates the angle formed by the verification line 262 and the reference line 252 (hereafter referred to as "edge angle"), and specifies the second edge-point 194A with the smallest edge angle as the "selected second edge-point". In the second edge-point image 260, the edge angle is minimum when the second edge-point 194A is selected. The position specifying unit 154 determines the next imaging position on the basis of the verification line 262A at this time.

As shown in FIG. 12, the second edge-point 194A (selected second edge-point) selected by the position specifying unit 154 on the basis of the edge angle is set on the far side from the tip of the tool 102, in other words, the root side of the tool 102 as viewed from the reference point 250 set in the second edge-point image 260. Then, the position specifying unit 154 determines the next imaging position so that the second edge-point 194A moves to the position of the lower half (tip side of the tool 102) in the tool length direction (Y-axis direction in FIG. 12) of the tool 102 ("upper" means root side of the tool 102 and "lower" means tip side of the tool 102). The position specifying unit 154 also determines the next imaging position so that the second edge-point 194A moves to the center side in the tool radial direction (X-axis direction in FIG. 12) of the tool 102. In FIG. 12, since the second edge-point 194A (selected second edge-point) is located on the positive Y-axis direction side (upper side) and the negative X-axis direction side (left side) of the second edge-point image 260, the position specifying unit 154 moves the tool 102 along a movement vector 264 (negative Y-axis direction and positive X-axis direction) to change the relative positions of the imaging area 170 and the tool 102 so that the second edge-point 194A (selected second edge-point) moves to the lower side and to the center side.

That is, the position specifying unit 154 moves the tool 102 (the spindle 116) along the verification line 262A in the direction indicated by the movement vector 264 shown in FIG. 12. At this time, the Y component (insertion direction) of the movement vector 264 of the tool 102 may be constant. That is, according to the magnitude of the minimum edge angle, the position control unit 156 adjusts the magnitude of the X component of the movement vector 264 for the tool 102. When the tool 102 moves in the direction of the movement vector 264, the second edge-point 194A (the point indicating the contour line) moves toward the center in the next partial image 290. With such a control method, it is possible to control so that the contour line of the tool 102 does not come off in the imaging area 170, in other words, so as not to capture a partial image that does not include the contour line. In the present embodiment, the processing time required for direction specifying processing per partial image is about 10 to 20 milliseconds.

Figure 13:
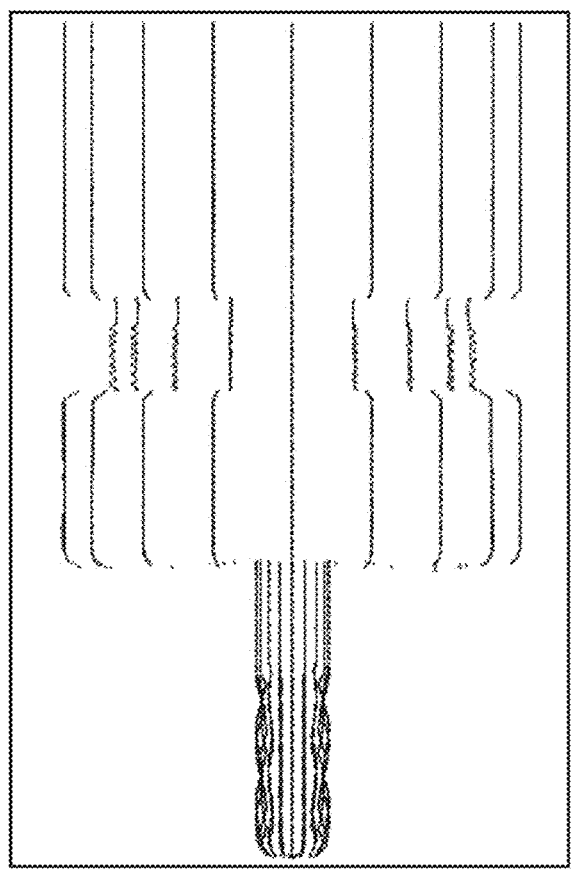
FIG. 13 illustrates tool shape data for a tool.

FIG. 13 illustrates the tool shape data of the tool 102.

The position control unit 156 sets the spindle rotation angle of the tool 102 about the Y-axis center, and then moves the tool 102 in the X-axis direction on the basis of the edge angle while also moving the tool 102 in the negative Y-axis direction. The outer shape of the tool 102 is specified by capturing the partial image 290 in the imaging area 170 and detecting the first edge-points 192 from the partial image 290. After detecting the first edge-points 192, the next imaging position is adjusted by detecting the second edge-points 194. A plurality of partial images are captured per spindle rotation angle. Then, the position control unit 156 rotates the tool 102 by 12 degrees and performs the same process for the next spindle rotation angle.

If ten partial images 290 are captured per one spindle rotation angle, a total of 300 partial images 290 can be captured by 30 spindle rotation angle settings. The point sequence series data shown in the first edge-point image 190 are obtained from these partial images 290. The shape reproduction unit 158 synthesizes the point sequence data of each partial image 290 to generate the tool shape data shown in FIG. 13, i.e., the point sequence data indicating the three-dimensional shape of the tool 102.

SUMMARY OF EMBODIMENT

The image processing device 110 and the machine tool 100 have been described on the basis of the above described embodiment.

According to this embodiment, after a user attaches the tool 102 to the spindle 116 and inputs the tool ID, the tool shape data is automatically generated, and the tool ID and the tool shape data are registered in association with each other. The number of tools 102 registered in the tool storage unit 130 may be several dozen. Therefore, automating the registration of tool shape data has a great effect on improving the work efficiency of the machine tool 100.

In this embodiment, a small camera 106 is used to image only a part of the tool 102. The use of a small camera 106 reduces the cost of the camera 106 and also contributes to the space saving of the machining area 200. By performing direction specifying processing on the second edge-point image 260, the outer shape of the tool 102 can be appropriately recognized while reducing the number of times of capturing the partial image 290. A partial image 290 not including the contour of the tool 102 is unnecessary for the shape recognition of the tool 102. The position specifying unit 154 adjusts the amount of movement of the camera 106 in the X-axis direction on the basis of the edge angle so that the partial image always captures the outer shape of the tool 102.

In addition, the resolution of the partial image used in the direction specifying processing is set lower than that of the partial image used in the shape recognition process to speed up the direction specifying processing. Recognizing the outer shape of the tool 102 with a high-resolution partial image and specifying the moving direction of the tool 102 with a low-resolution partial image will improve both image recognition accuracy and processing speed.

The present invention is not limited to the embodiment described above and modifications thereof, and any component thereof can be modified and embodied without departing from the scope of the invention. Components described in the embodiment and modifications can be combined as appropriate to form various embodiments. Some components may be omitted from the components presented in the embodiment and modifications.

Modifications

In the above description, the shape reproduction unit 158 generates tool shape data as point sequence data (see FIG. 13). However, the shape reproduction unit 158 may generate tool shape data as a polygon by applying a texture to the point sequence data.

In the above embodiment, the camera 106 is fixed while moving the tool 102 (the spindle 116). As a modification, the tool 102 (the spindle 116) may be fixed while moving the camera 106. Alternatively, both the camera 106 and the tool 102 (the spindle 116) may be moved. In any case, a partial image may be captured while changing the relative positions of the camera 106 and the tool 102.

In the above embodiment, the shape recognition processing is followed by the direction specifying processing. As a modification, the shape recognition processing and the direction specifying processing may be executed in parallel.

In the above embodiment, the first edge-points 192 are detected for the outer shape recognition of the tool 102 and the second edge-points 194 are detected for the directional control of the tool 102 (the spindle 116). As a modification, the position specifying unit 154 may specify the moving direction of the tool 102 by calculating the verification line 262 and the edge angle on the basis of the first edge-points 192.

The image processing device 110 may include a receiving unit and an image processing unit. The receiving unit of the image processing device 110 receives a first partial image including a part of the tool 102 from the camera 106. Similarly, the receiving unit receives a second partial image including another part of the tool 102 from the camera 106. That is, the camera 106 or an image capturing device equipped with the camera 106 may have the functions of the imaging execution unit 152, the position specifying unit 154, the position control unit 156, the second edge detection unit 162, and the image conversion unit 164. The image processing unit of the image processing device 110 has the functions of the shape reproduction unit 158 and the first edge detection unit 160.

The image processing unit of the image processing device 110 receives the first partial image (e.g., partial image P1 in FIG. 6) and the second partial image (e.g., partial image P2 in FIG. 6) corresponding to the next imaging position with the camera 106 or the like. The same applies to the subsequent partial image (partial image P3). The image processing unit extracts first contour data indicating the contour of the tool 102 from the first partial image and second contour data indicating the contour of the tool 102 from the second partial image. The method for extracting the contour data is the same as the method described in relation to FIGS. 11 and 12. Then, the image processing unit may reproduce the tool contour data of the tool 102 on the basis of the contour data (point group) obtained from a plurality of partial images.

In the above embodiment, the tool 102 is imaged sequentially from the tip to the root after the spindle rotation angle is set to a predetermined angle, and the spindle rotation angle is changed after the imaging is completed. The present invention is not limited to this and the tool 102 may be continuously imaged by the camera 106 while rotating the tool 102. For example, the camera 106 may capture images in multiple angles while rotating the camera 106 by synchronizing the rotation timing of the spindle 116 with the imaging timing of the camera 106 so that the camera 106 captures images of the tool 102 every t seconds while rotating the tool 102 by a predetermined angle every t seconds. After one rotation of the camera 106 at a predetermined position, the camera 106 may be moved horizontally in the XY direction and the camera 106 may perform image capturing again from multiple angles at another position.

The camera 106 may image the tool 102 at regular time intervals. At this time, the camera 106 may send a synchronization signal to the image processing device 110 in accordance with the imaging timing. The image processing device 110 may control the timing of the movement or rotation of the tool 102 in accordance with this synchronization signal.

It is also possible that the imaging timing of the camera 106 and the rotation timing of the spindle rotation angle do not perfectly match. The camera 106 may transmit a synchronization signal to the machining control unit 122 and the image processing device 110 at the imaging timing, and the image processing device 110 may measure the rotation angle of the spindle 116 when the synchronization signal is received. For example, it is assumed that the tool 102 is imaged by the camera 106 at a timing when the spindle rotation angle is set to 36 degrees. However, imaging might be performed when the rotation of the spindle 116 is not fully completed, e.g., when the spindle rotation angle is 35.99 degrees. Therefore, the machining control unit 122 may measure the actual spindle rotation angle at the imaging timing, and the imaging execution unit 152 may store the partial image and the actual spindle rotation angle in association with each other. With such a control method, the actual spindle rotation angle in the partial image (captured image) can be accurately recorded, which makes it easier to reproduce tool contour data more accurately.

The image processing device 110 may perform: a step of capturing a partial image including a part of the tool 102 by the camera 106; a step of specifying a next imaging position on the basis of the partial shape of the tool 102 included in the partial image; a step of changing the relative positions of the tool 102 and the camera 106 to the specified imaging positions; and a step of capturing a partial image including a part of the tool 102 at the next imaging position.

The various computers exemplified by the image processing device 110 may execute a computer program that implement: a function of capturing a partial image including a part of the tool 102 by the camera 106; a function of specifying the next imaging position on the basis of the partial shape of the tool 102 included in the partial image; a function of changing the relative positions of the tool 102 and the camera 106 to the specified imaging positions; and a function of capturing a partial image including a part of the tool 102 at the next imaging position.

Figure 14:
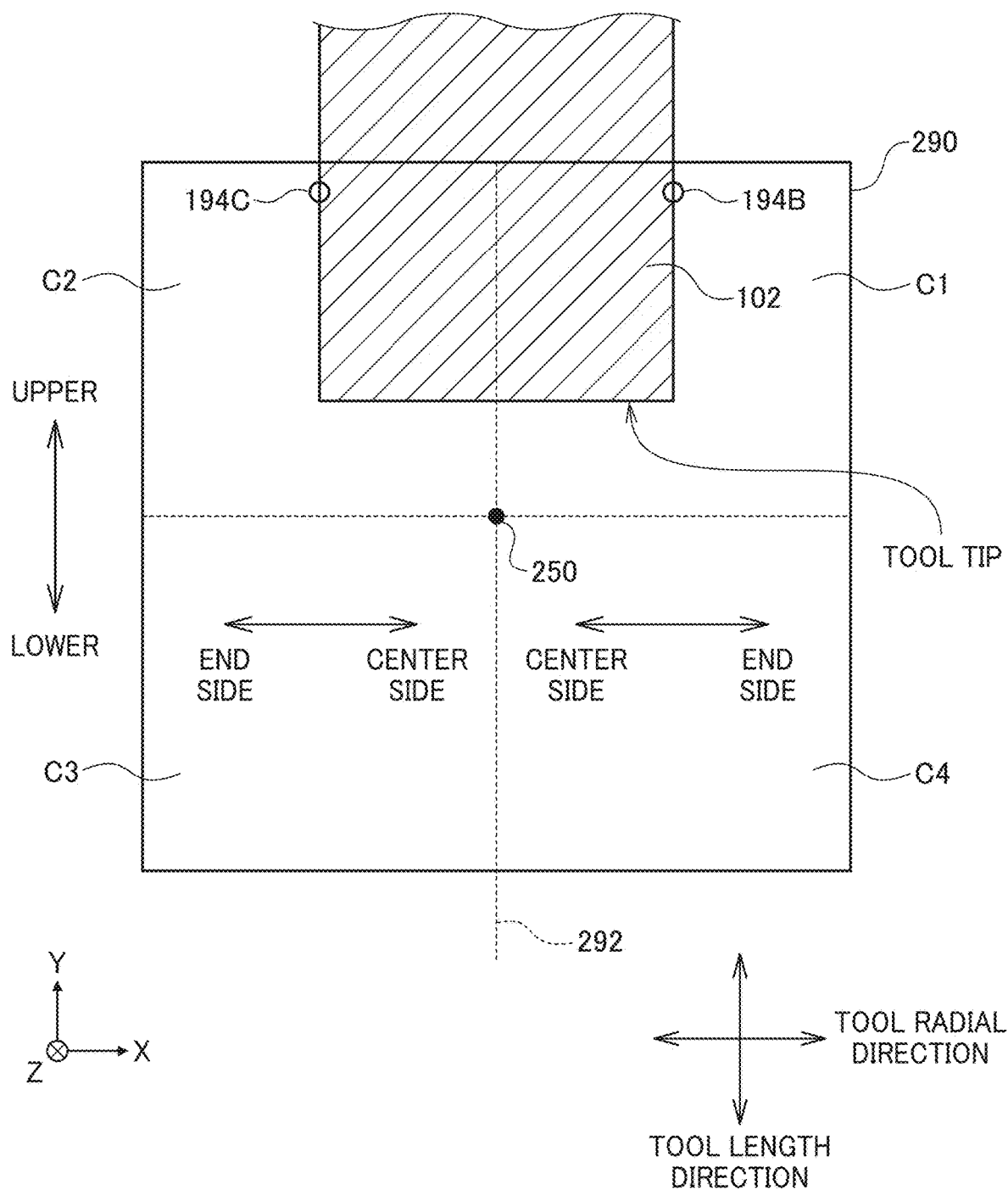
FIG. 14 is a schematic view illustrating a partial image at the time of tool tip detection in Modification 1.

FIG. 14 is a schematic view illustrating a partial image at the time of tool tip detection in Modification 1.

In the partial image 290 (imaging area 170), the position specifying unit 154 specifies the tip of the tool 102 (hereafter referred to as "tool tip"). The center of the partial image 290 is the reference point 250. With regard to the partial image 290 in FIG. 14, the lower side of the drawing (the negative Y-axis side) is referred to as the "lower side" and the upper side of the drawing (the positive Y-axis side) is referred to as the "upper side".

The extending direction of the tool 102 is referred to as the "tool length direction" and the radial direction (transverse direction) of the tool 102 is referred to as the "tool radial direction". The line in the Y-axis direction passing through the reference point 250 is called the "center line 292". In the tool radial direction, the direction toward the center line 292 is called the "center side" and the direction away from the center line 292 is called the "end side".

The partial image 290 is equally divided into four regions with the reference point 250 as the center, the upper right region is referred to as the first area C1, the upper left region is referred to as the second area C2, the lower left region is referred to as the third area C3, and the lower right region is referred to as the fourth area C4.

By a method similar to that described in relation to FIGS. 11 and 12, the position specifying unit 154 specifies a plurality of second edge-points 194. In Modification 1, the position specifying unit 154 selects the second edge-points 194 farthest from the reference point 250. In FIG. 14, the second edge-points 194 farthest from the reference point 250 are a second edge-point 194B and a second edge-point 194C. The position specifying unit 154 selects a second edge-point 194 located on the first area C1 or on the center line 292 from the second edge-point 194B and the second edge-point 194C. In FIG. 14, the second edge-point 194B in the first area C1 is selected. The position control unit 156 instructs the moving direction of the tool 102 to the machining control unit 122 so that the selected second edge-point 194B (selected second edge-point) overlaps with the reference point 250.

Figure 15:
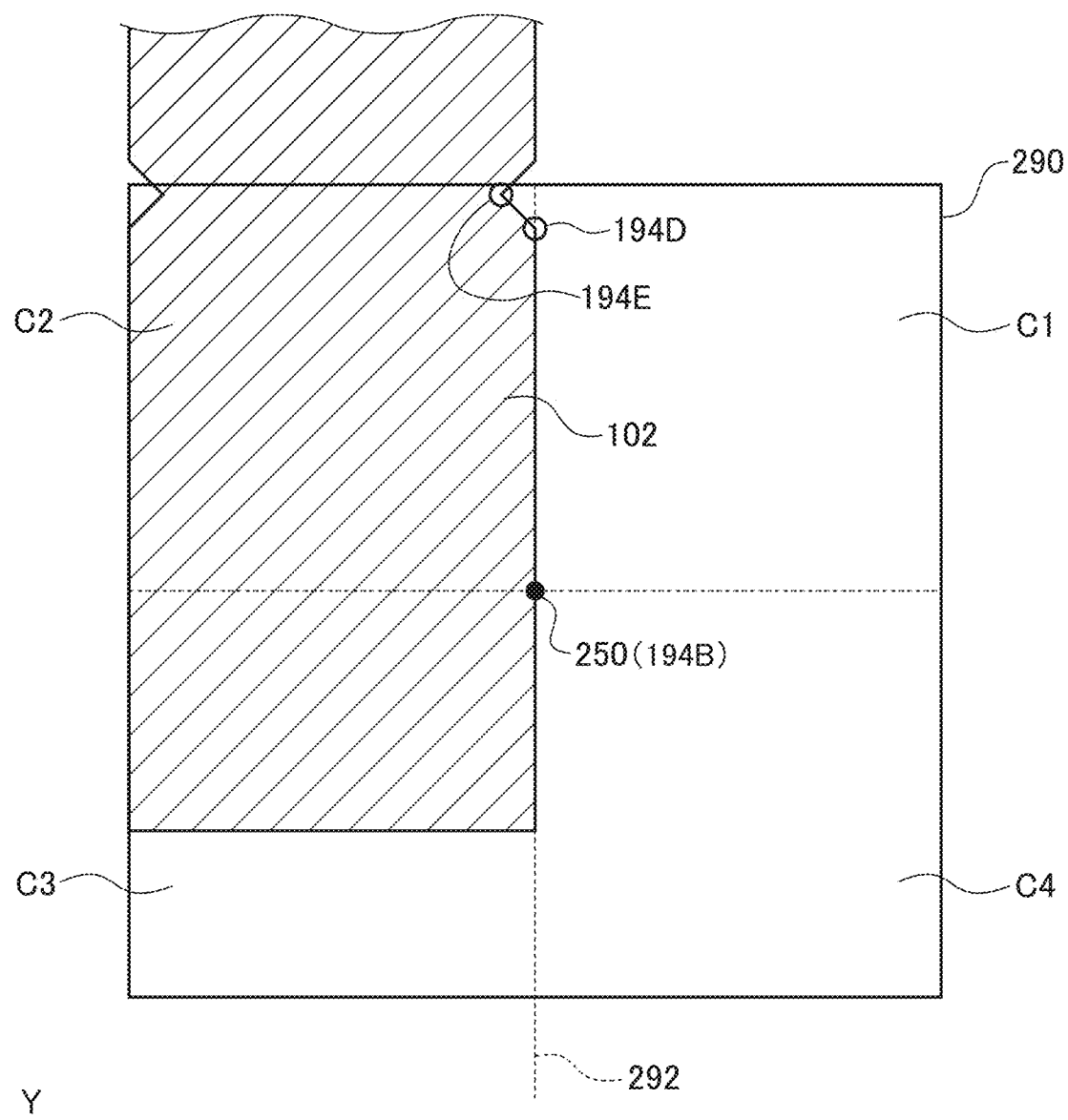
FIG. 15 is a schematic view illustrating a partial image after tool movement in Modification 1.

FIG. 15 is a schematic view illustrating a partial image after tool movement in Modification 1.

By the movement of the tool 102, the second edge-point 194B coincides with the reference point 250. The position control unit 156 again selects a second edge-point 194E farthest from the reference point 250. However, the second edge-point 194E does not satisfy the condition "on the first area C1 or on the center line 292". Then, the position control unit 156 selects the second edge-point 194D which is next farthest as compared with the second edge-point 194E. The second edge-point 194D lies on the center line 292, thereby satisfying the above condition. At this time, the position control unit 156 instructs the moving direction to the machining control unit 122 so that the second edge-point 194D (selected second edge-point) overlaps with the reference point 250. In Modification 1, a plurality of partial images 290 are acquired from the tool 102 by repeating such control.

Figure 16:
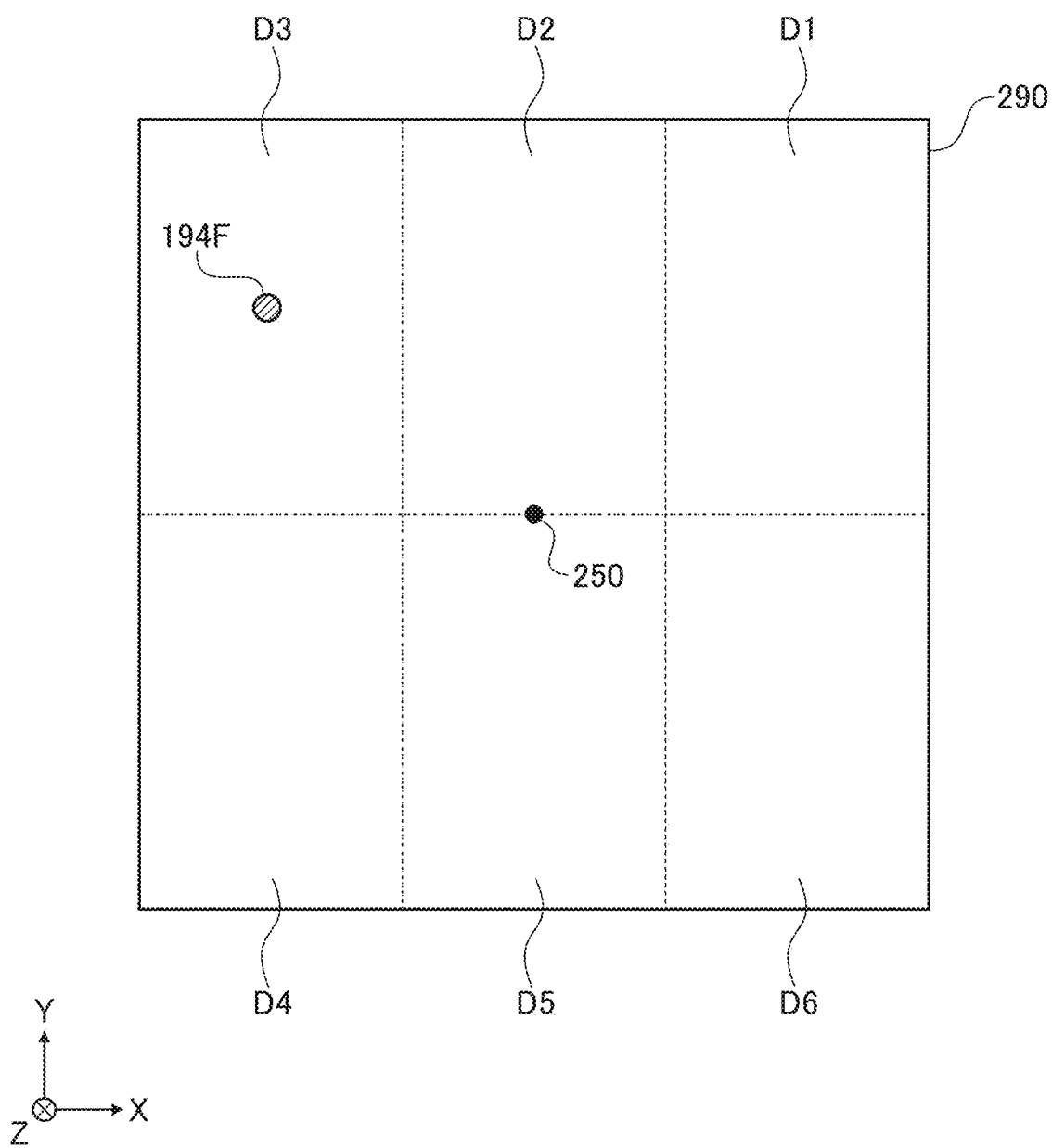
FIG. 16 is a first schematic diagram illustrating a position control method when a second edge-point is detected in the third area in Modification 2.

FIG. 16 is a first schematic diagram illustrating a position control method when a second edge-point is detected in the third area in Modification 2.

In Modification 2, the partial image 290 is divided into six regions from the first area D1 to the sixth area D6 as shown in FIG. 16. Here, it is assumed that a second edge-point 194F (the farthest second edge-point 194 from the reference point 250) is detected in the upper left third area D3.

Figure 17:
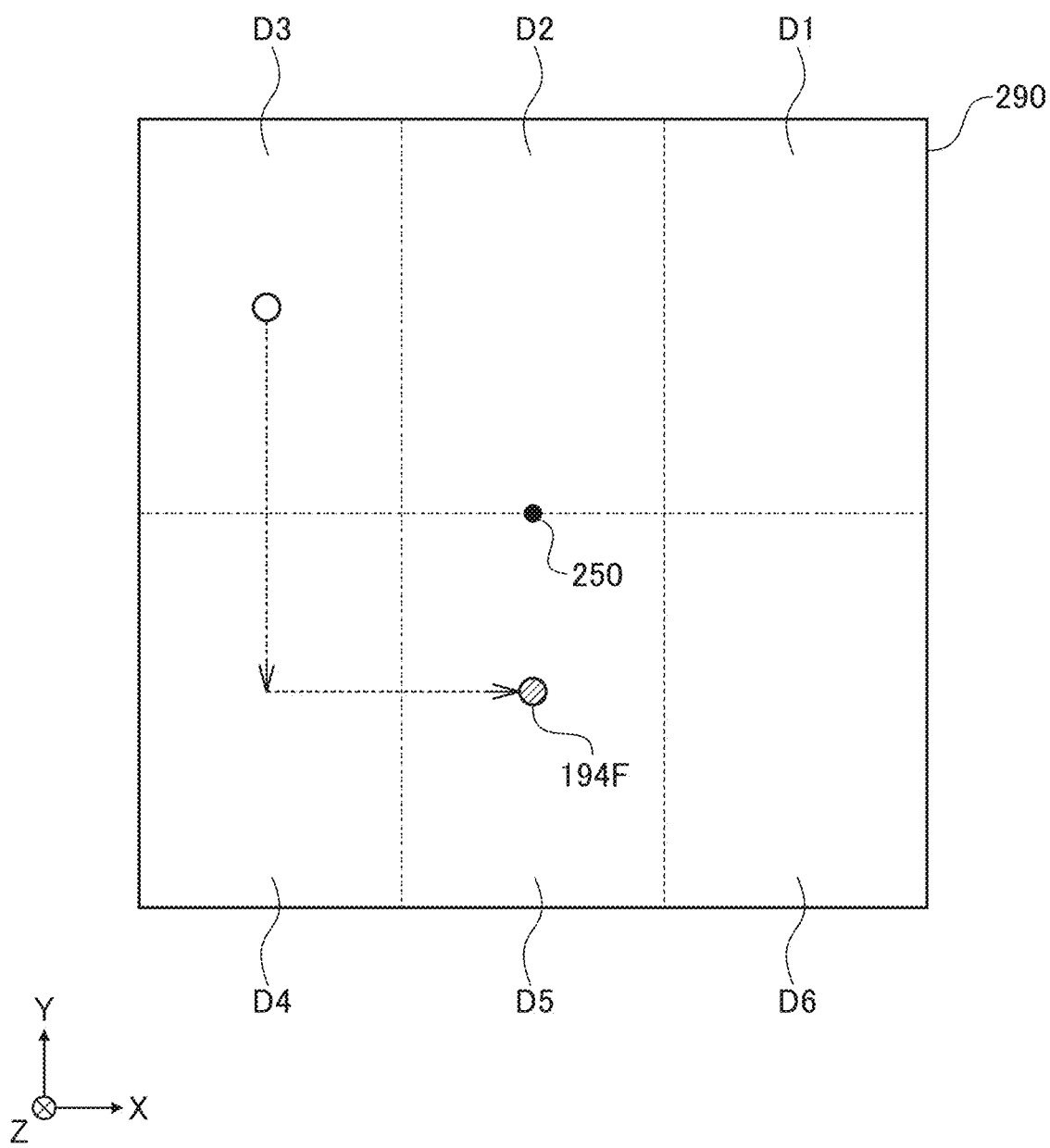
FIG. 17 is a second schematic diagram illustrating a position control method when a second edge-point is detected in the third area in Modification 2.

FIG. 17 is a second schematic diagram illustrating a position control method when a second edge-point is detected in the third area in Modification 2.

In Modification 2, the position control unit 156 instructs the moving direction of the tool 102 to the machining control unit 122 so that the second edge-point 194F is included in the fifth area D5. As shown in FIG. 17, when the second edge-point 194E is detected in the third area D3, the tool 102 will move in both the Y direction (tool length direction) and the X direction (tool radial direction).

Figure 18:
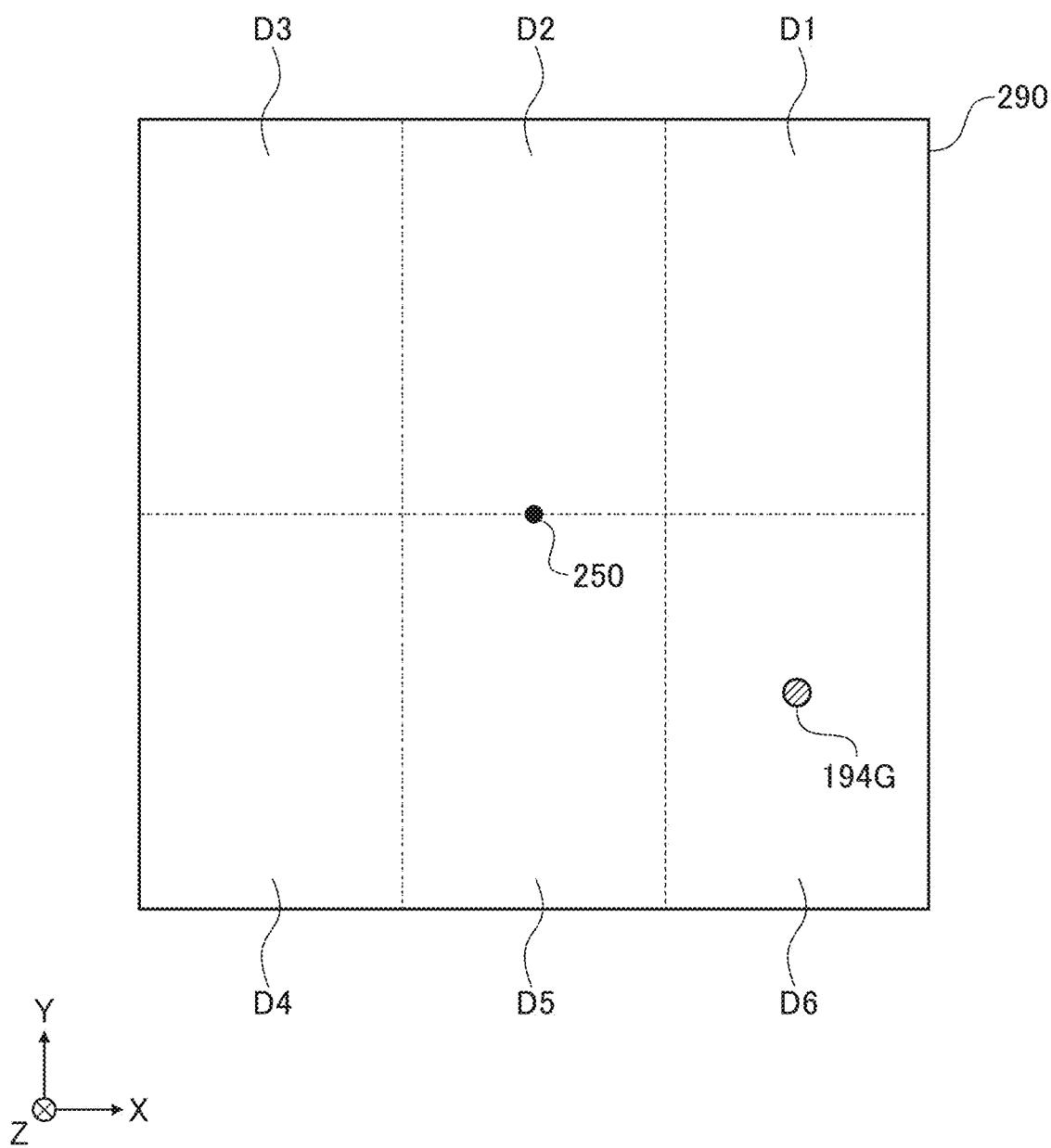
FIG. 18 is a first schematic diagram illustrating a position control method when a second edge-point is detected in the sixth area in Modification 2.

FIG. 18 is a first schematic diagram illustrating a position control method when a second edge-point is detected in the sixth area in Modification 2.

Here, it is assumed that a second edge-point 194G (the farthest second edge-points 194 from the reference point 250) is detected in the lower right sixth area D6.

Figure 19:
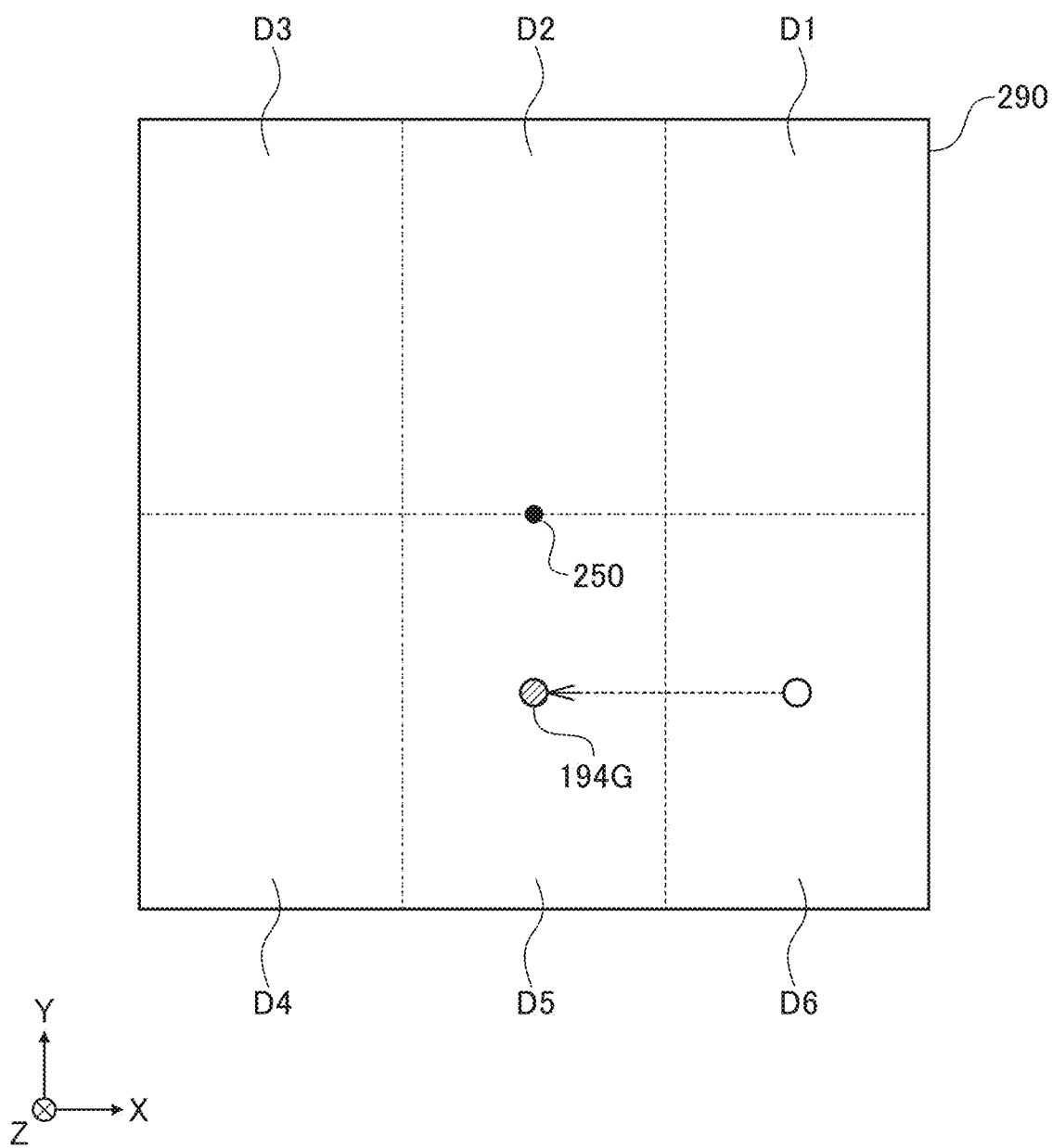
FIG. 19 is a second schematic diagram illustrating a position control method when a second edge-point is detected in the sixth area in Modification 2.

FIG. 19 is a second schematic diagram illustrating a position control method when a second edge-point is detected in the sixth area in Modification 2.

As in FIG. 16 and FIG. 17, the position control unit 156 instructs the moving direction of the tool 102 to the machining control unit 122 so that the second edge-point 194G is included in the fifth area D5. As shown in FIG. 19, when the second edge-point 194G is detected in the sixth area D6, the tool 102 will move in the X direction (tool radial direction).

In this way, the position specifying unit 154 detects multiple second edge-points 194 and selects a second edge-point 194 in the upper half (first area D1 to third area D3) of the partial image 290 (imaging area 170). Although the second edge-point 194 farthest from the reference point 250 is selected in FIGS. 17 to 19 in the above example, any second edge-point 194 in the upper half may be selected. The position control unit 156 instructs the moving direction of the tool 102 to the machining control unit 122 so that the selected second edge-point 194 is positioned in the middle region (the fifth area D5) in the lower half that is divided into three regions.

What is claimed is:

1. An image processing device, comprising:
 a second edge detection unit that detects a plurality of second edge-points indicating an outer shape position of a tool in a first partial image including a part of the tool;
 a movement specifying unit that selects, from second edge-points of a part of the plurality of second edge-points, a second edge-point on the far side from a tip of the tool as a selected second edge-point for specifying a next imaging position to specify a moving direction of relative positions of a camera and the tool so that the selected second edge-point is located at the lower half positions in the tool length direction and at the center side in the tool diameter direction in the first partial image; and
 a position control unit that changes the relative positions of the tool and the camera on the basis of the moving direction,
 wherein the image processing device causes the camera to capture a second partial image including the selected second edge-point and including a part of the tool at the next imaging position.

2. An image processing device, comprising:
 a second edge detection unit that detects a plurality of second edge-points indicating an outer shape position of a tool in a first partial image including a part of the tool;
 a position specifying unit that selects, from the plurality of second edge-points, a second edge-point at which the relative angle between a given reference line extending from a given reference point and a verification line connecting the reference point and the second edge-points is minimized in the first partial image as the selected second edge-point to specify a moving direction of the relative positions of a camera and the tool in the direction in which the selected second edge-point approaches the reference point; and
 a position control unit that changes the relative positions of the tool and the camera on the basis of the moving direction, and
 wherein the image processing device causes the camera to capture a second partial image including the selected second edge-point and including a part of the tool at the next imaging position.

3. The image processing device according to claim 1, wherein a second edge-point at which the relative angle between a given reference line extending from a given reference point and a verification line connecting the reference point and the second edge-points is minimized in the first partial image is selected as the selected second edge-point to specify a moving direction of relative positions of the camera and the tool in the direction in which the selected second edge-point approaches the reference point.

4. The image processing device according to claim 1, wherein an imaging execution unit captures the first partial image of the tool when the tip of the tool is detected in an imaging range during moving the camera and the tool relative to each other.

5. The image processing device according to claim 1,
wherein the position control unit further changes the relative angle between the tool and the camera, and
wherein the imaging execution unit captures partial images for each of a plurality of relative angles.

6. The image processing device according to claim 1, further comprising:
a first edge detection unit that detects a plurality of first edge-points indicating the outer shape position of the tool in the first partial image; and
a shape reproduction unit that forms tool shape data indicating the outer shape of the tool on the basis of the plurality of first edge-points detected from the first partial image.

7. The image processing device according to claim 6, further comprising:
an image conversion unit that converts the first partial image into a low-resolution image,
wherein the second edge detection unit detects second edge-points from the low-resolution first partial image.

8. The image processing device according to claim 1, further comprising:
an ID accepting unit that accepts input of a tool ID that identifies a tool;
a first edge detection unit that detects a plurality of first edge-points indicating the outer shape position of the tool in the first partial image;
a shape reproduction unit that forms tool shape data indicating the outer shape of the tool on the basis of a plurality of first edge-points detected from a plurality of first partial images; and
a tool registration unit that registers a tool ID and tool shape data in association with each other.

9. A machine tool, comprising:
a camera;
a tool holding unit to which a tool is attachable;
a machining control unit that machines a workpiece with a tool according to a machining program;
an imaging execution unit that captures a first partial image including a part of the tool by the camera;
a position specifying unit that specifies a next imaging position on the basis of a partial shape of the tool included in the first partial image; and
a position control unit that changes the relative positions of the tool and the camera to the next imaging position,
wherein the imaging execution unit captures a second partial image including a part of the tool at the next imaging position.

\* \* \* \* \*